United States Patent
Bosse et al.

(10) Patent No.: US 12,434,740 B1
(45) Date of Patent: Oct. 7, 2025

(54) DETERMINING OBJECT ORIENTATION BASED ON PARAMETER MODES

(71) Applicant: Zoox, Inc., Foster City, CA (US)

(72) Inventors: Michael Carsten Bosse, Templeton, CA (US); John Bryan Carter, Upton, MA (US); Shuangting Liu, Foster City, CA (US); Francesco Papi, Oakland, CA (US); Nicholas George Dilip Roy, Needham, MA (US); Zachary Sun, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 221 days.

(21) Appl. No.: 18/087,601

(22) Filed: Dec. 22, 2022

(51) Int. Cl.
 *B60W 60/00* (2020.01)
 *B60W 40/02* (2006.01)

(52) U.S. Cl.
 CPC ........ *B60W 60/0027* (2020.02); *B60W 40/02* (2013.01); *B60W 2520/14* (2013.01); *B60W 2554/4041* (2020.02); *B60W 2554/4044* (2020.02); *B60W 2554/80* (2020.02)

(58) Field of Classification Search
 None
 See application file for complete search history.

(56) References Cited

U.S. PATENT DOCUMENTS

| | | | |
|---|---|---|---|
| 9,248,834 B1* | 2/2016 | Ferguson | B60W 30/09 |
| 10,981,564 B2* | 4/2021 | Herman | B60W 30/0956 |
| 11,393,216 B2* | 7/2022 | Maloney | G01C 21/3815 |
| 11,858,536 B1* | 1/2024 | Liu | G06N 3/0464 |
| 12,065,140 B1* | 8/2024 | Pronovost | B60W 40/04 |
| 2005/0125154 A1* | 6/2005 | Kawasaki | G01D 1/16 |
| | | | 701/408 |
| 2021/0049378 A1* | 2/2021 | Gautam | G06T 7/20 |
| 2021/0056365 A1* | 2/2021 | Sivan | G06V 20/58 |
| 2021/0347377 A1* | 11/2021 | Siebert | G06N 5/04 |
| 2022/0128700 A1* | 4/2022 | Saranin | G06T 7/11 |
| 2024/0123982 A1* | 4/2024 | Rudenko | G01C 21/3415 |
| 2024/0246574 A1* | 7/2024 | Abdulhamid | B60W 60/0027 |
| 2025/0074474 A1* | 3/2025 | Hasfura | B60W 60/0027 |

* cited by examiner

Primary Examiner — David P. Merlino
(74) Attorney, Agent, or Firm — Lee & Hayes, P.C.

(57) ABSTRACT

Systems and techniques for determining more accurate object parameter values, such as orientation values (e.g., yaw, location, position, etc.), for objects detected in an environment are disclosed. A vehicle computing system may receive sensor data from multiple sensor systems that indicates a parameter value determined at the individual sensor systems. The vehicle computing system may determine values and probabilities for particular parameters modes based on the sensor data parameter values and may further filter these values using a mixture model to determine probability distributions for the modes and associated values. These filtered values and modes may then be used to determine predicted object trajectories that can be used to control a vehicle.

20 Claims, 5 Drawing Sheets

DETERMINING OBJECT ORIENTATION BASED ON PARAMETER MODES

BACKGROUND

A vehicle may be equipped with various systems to detect objects in an environment and use detection information to control the vehicle to avoid the objects. Detected objects may include objects in motion or that may potentially be in motion, such as other vehicles, bicycles, pedestrians, etc. In order to plan trajectories and safely navigate around objects in the environment, a vehicle's trajectory planning system may determine various attributes of such objects, including position, heading, yaw, velocity, and acceleration.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
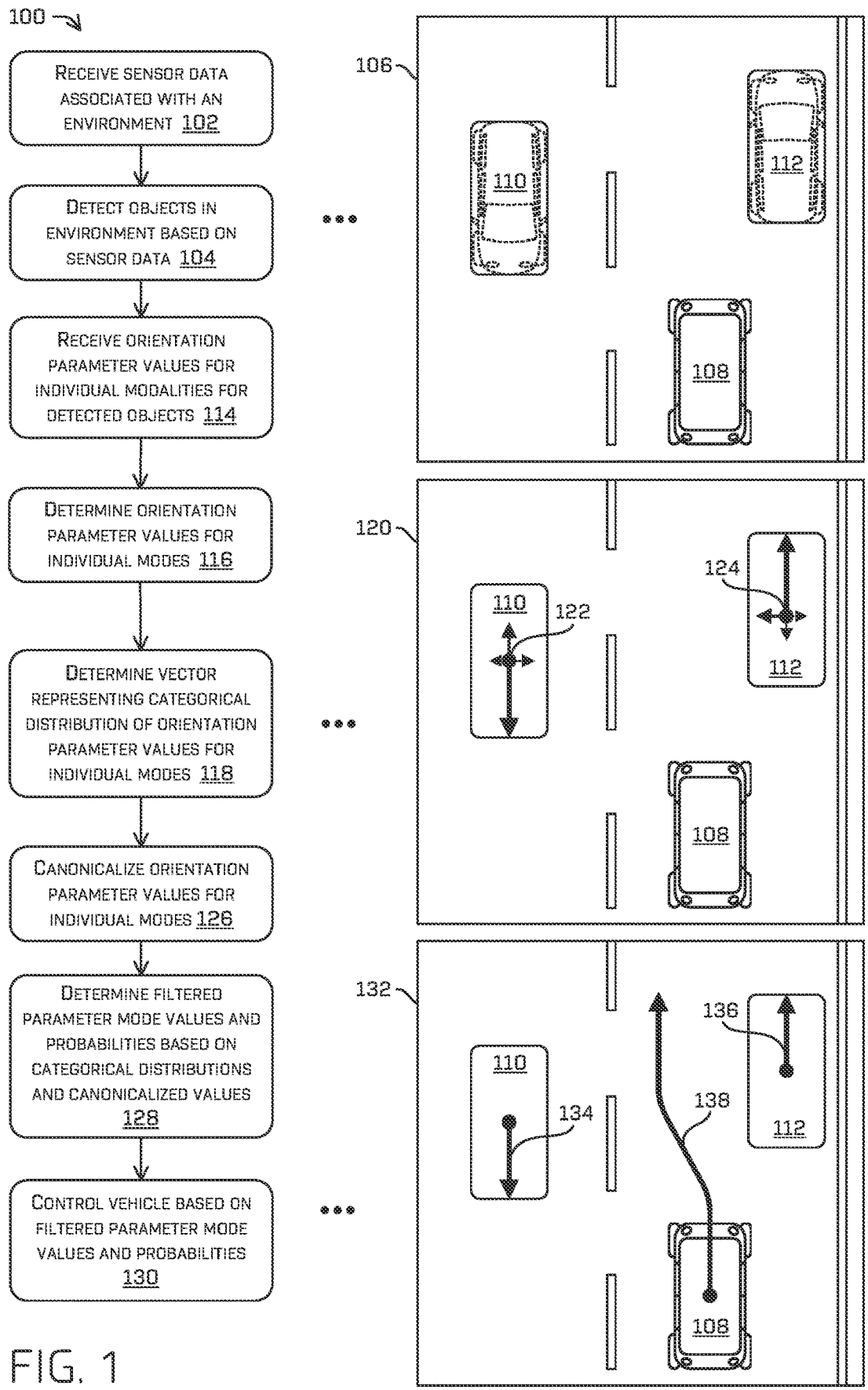
FIG. 1 is a pictorial flow diagram illustrating an example process for determining and dynamic object orientations for use in controlling a vehicle, in accordance with examples of the disclosure.

Sensor data collected in an environment may represent a dynamic object detected at a single point in time and therefore may not fully represent the motion of the object. In some cases, a detected dynamic object may not be in motion when detected even though it may have the potential to begin moving (e.g., a parked car), which may also limit the motion data available for such an object. The orientation of a dynamic object (e.g., the heading, yaw, or direction in which it is moving or likely to move) may be useful in predicting the motion of the object and determining a safe trajectory for operating a vehicle around the object. Without motion data for a dynamic object, accurately determining a dynamic object's orientation or other parameters in order to safely control a vehicle in an environment that the vehicle shares with the object may, at times, present challenges.

To address such challenges, techniques for determining parameters associated with objects detected in an environment for use in generating predicted object trajectories and operational vehicle trajectories are discussed herein. For example, the parameters may include values representing physical parameters such as object position, orientation, velocity, acceleration, etc. The parameters may also, or instead, include values representing non-physical parameters such as object classification, one or more labels, etc. A vehicle traversing an environment, such as an autonomous vehicle, may be configured with one or more sensor systems and a vehicle computing system. The vehicle computing system may be configured to received sensor data associated with the environment from the sensor systems and detected objects in the environment based on the data. Such objects may be static (e.g., not in motion and/or not capable of motion) or dynamic (e.g., in motion or capable of being in motion). In examples, a vehicle computing system may determine predicted trajectories for detected dynamic objects. Such trajectories may include predicted paths of travel for an object over a future period of time and/or predicted distance of travel. Such trajectories may also, or instead, include other predicted properties of the object as it travels along a predicted path, such as location, heading, velocity, acceleration, etc. Predicted object trajectories may be used, for example, to determine one or more vehicle trajectories that may be used or considered for use by the vehicle computing system in controlling the vehicle. For example, a vehicle computing system may determine a predicted trajectory for an object detected in an environment and then determine an operational trajectory for the vehicle that avoids an intersection with the predicted object trajectory.

To determine a predicted object trajectory, a vehicle computing system may use various parameters determined for an object. For example, a vehicle computing system may determine orientation data for a vehicle detected in an environment. Orientation data for a vehicle may include one or more object orientation values such as a heading (e.g., a direction of travel), a location (e.g., described using two-dimensional coordinates (e.g., x and y)), and yaw (rotation of the vehicle about the x and y coordinates). Other parameters that may be used in determining predicted object trajectories may include velocity, acceleration, object classification, object altitude, etc.

The data used to determine such parameters may be incomplete or ambiguous. In examples, a parameter may be determined based on sensor data that may be collected by a variety of modalities. For example, a vehicle may be configured with lidar sensors, radar sensors, and vision sensors (e.g., cameras). This sensor data may be used to determine one or more orientation parameters for an object detected in an environment. However, an orientation determination based on data from one modality may not correspond to an orientation determination based on data from another modality. For example, lidar sensor data may be used to determine that a vehicle detected in an environment is headed north, while radar sensor data may be used to determine that the same vehicle is headed south. Moreover, sensor data from a particular sensor system may be used to determine conflicting parameter data for an object detected in an environment. For example, processing of lidar sensor data may result in determinations that a vehicle detected in an environment may be headed north and south. This may be because when data is collected, an object may not currently be in motion and/or the data may be captured at a time period too brief to use to determine motion.

When single value for a parameter is determined based on ambiguous data, the single value may be subject to abrupt change over time due to changes in the underlying data or the interpretation of such data. For example, a yaw value may be determined for a detected vehicle in an environment based on sensor data collected at a first time that seems to indicate that the vehicle is traveling north. However, if the sensor data includes errors that are missing from subsequent sensor data collected at a later time, the yaw value may be determined at that later time to be the opposite value (e.g., the vehicle is actually traveling south).

In other examples, an incorrect orientation may be determined, correctly or incorrectly, based on other factors. For example, an orientation of a vehicle that is not currently in motion may be determined based on sensor data and/or an object detection. However, once the vehicle begins moving, it may be determined that the vehicle orientation was determined incorrectly. An object may also, or instead, be incorrectly classified as an object that has particular modes. For example a nonmoving vehicle may be classified as a motorcycle with two modes (0 and 180 degrees) and then reclassified as a car or truck that may have four modes (0, 90, 180, ad 270 degrees) when it starts moving. As will be appreciated, this sudden change of a detected object parameter (e.g., predicted parameter) over a short period of time may result in an abrupt change in the controlling of a vehicle, corresponding to potentially unsafe and/or uncomfortable operation of the vehicle because it may be determining its operational trajectory based on the detected object parameter.

In examples, a vehicle computing system may use errors and/or probabilities associated with sensor data and/or other data used in object detection operations to determine values for particular parameter modes and associated probabilities. A mode may be a more common or likely form, representation, or value of a parameter. In examples, modes may be a subset of all possible values or representations of a parameter. For example, while yaw may be represented as any number of degrees from 0 to 359, the modes for yaw may be defined as the four major or cardinal directions of 0, 90, 180, and 270 degrees relative to a location (e.g., when yaw is representing a parameter of a dynamic object such as a vehicle).

The vehicle computing system may use mode values and probabilities to determine predicted object trajectories. The predicted object trajectories associated with particular parameter mode values and probabilities may then be used to determine one or more candidate vehicle trajectories from which an operational trajectory for a vehicle may be determined and used to control the vehicle. Because these predicted object trajectories may be based on particular parameter modes and may integrate the probabilities associated with such modes, the vehicle computing system may have more complete and accurate information on which to base operational trajectory decisions and may therefore reduce the possibility of abrupt trajectory changes and sudden, potentially hazardous, vehicle operation.

In various examples, a vehicle computing system may receive sensor data from a lidar sensor system, a radar sensor system, a vision sensor system, and/or any other type of sensor system. The vehicle computing system may also receive and/or access other data associated with an environment, such as mapping data, roadway data, tracking data, detection data, etc. The vehicle computing system (e.g., a parameter mode data determination system or component configured at the vehicle computing system) may use this data to determine values for a particular parameter, such as yaw, that may be associated with an object detected in the environment. The vehicle computing system may further use this data to determine the probability (may be represented and/or described as a weight or likelihood) associated with individual such values representing the likelihood that the associated value is accurate.

For example, yaw may be a value from 0 to 359 degrees representing the rotation of an object, such as a vehicle, about its x and y location coordinates (e.g., relative to a top-down view of the environment in which the vehicle is location). A vehicle computing system may determine, based on lidar sensor data, vision sensor data, and/or other, a subset of yaw values associated with a detected vehicle that are non-negligible (e.g., significantly greater than zero or null). The vehicle computing system may also determine probabilities associated with such values. The vehicle computing system may also similarly determine a subset of yaw values and probabilities associated with such values for radar data and vision data.

While yaw is used as an example throughout this disclosure, and other orientations that are described in relation to top-down perspective views of an environment, the described techniques and systems may be applied to a variety of objects that may be capable of moving and/or having any orientation. Moreover, the techniques and systems described herein may use any type of data based on any perspective of an environment to perform the disclosed operations.

The vehicle computing system may determine one or more modes (e.g., forms or types) for the parameter and filter data from yaw values and probabilities that are not associated with such modes. A number of modes associated with an object may be based on various criteria. For example, a vehicle may generally be rectangular in shape and may therefore normally be expected to travel in one of the four cardinal directions with respect to the location of the vehicle. The yaw values associated with such directions may be represented as 0, 90, 180, and 270 degrees. These directions may correspond to the orientations that may be available for classification of object (e.g., a vehicle) that may correspond to directional modes available to that class of object. For example, a vehicle with four wheels may be represented as a bounding box (e.g., from a top-down perspective) and may have wheels oriented perpendicular to a side of the bounding box such that the direction of travel/mode may be oriented perpendicularly to any side of the bounding box. Other objects, such as pedestrians, may have different mode values and/or types because, for example, they are more readily capable of motion in different direction than vehicles and they may be represented by a point, contour, etc. The vehicle computing system may determine the yaw values that are associated with one of these modes and retain the values and probabilities for further processing as described herein. Alternatively, the vehicle computing system may determine the parameter values that are non-negligible and retain those values and associated probabilities for further processing. Other objects may have different associated modes. For example, pedestrians, bicycles, and/or other types of dynamic objects may have more and/or different available modes than vehicles. A parameter mode value may represent the parameter value at a particular mode. In some examples, a mode and value may be equivalent (e.g., yaw modes of 0, 90, 180, and 270 degrees may also represent the yaw values for such modes). In other examples, the mode may be distinct from the associated parameter value at that mode.

The resulting parameter mode values and probabilities may then be provided to a multiple parameter mode hypotheses filter component (e.g., implemented as and/or associated with a mixture model (e.g., Gaussian mixture model)) that may process the parameter values and associated probabilities as described herein to determine a particular value and probability for individual modes. For example, the multiple parameter mode hypotheses filter component may determine, for a vehicle detected in an environment, a probability for the individual yaw modes of 0, 90, 180, and 270 degrees.

The output of the multiple parameter mode hypotheses filter component may be provided to a prediction component for predicted object trajectory determinations and/or to a planner for determining trajectories and/or controls that may be used to control a vehicle in an environment. The prediction component may use the individual modes and the associated probabilities to determine an associated predicted object trajectory. The prediction component may associate or otherwise integrate the mode probability into these trajectory for use downstream in a planning component in determining an operational vehicle trajectory. For example, continuing the detected vehicle yaw example, the vehicle computing system may determine a predicted object trajectory for a detected vehicle with the vehicle at 0 degree yaw and may use or otherwise integrate the probability associated with the 0 degree yaw value into the trajectory. The vehicle computing system may similarly determine predicted object trajectories for the 90, 180, and 270 degree yaw values and associated probabilities for the vehicle.

Examples of techniques for predicting trajectories for objects in an environment can be found, for example, in U.S. Pat. No. 11,169,531, issued Nov. 9, 2021, and titled "Trajectory Prediction on Top-Down Scenes," the contents of which is herein incorporated by reference in its entirety and for all purposes. Examples of techniques for using predicting object trajectories to determine an operational trajectory for a vehicle can be found, for example, in U.S. patent application Ser. No. 17/681,461, filed Feb. 2, 2022, and titled "Generating Predictions based on Object Type," the contents of which is herein incorporated by reference in its entirety and for all purposes.

These predicted object trajectories may be used by the vehicle computing system, (e.g., a planning component configured at the vehicle computing system) to determine candidate trajectories. For example, because the control applied at the vehicle may vary depending on the motion of detected objects in the environment, the vehicle computing system may determine different candidate vehicle trajectories for different parameter mode values. Continuing the detected vehicle yaw example, the vehicle computing system may determine a first candidate vehicle trajectory based on the predicted object trajectory associated with the detected vehicle having a 0 degree yaw value, a second candidate vehicle trajectory based on the predicted object trajectory associated with the detected vehicle having a 90 degree yaw value, a third candidate vehicle trajectory based on the predicted object trajectory associated with the detected vehicle having a 270 degree yaw value, and so forth.

The vehicle computing system may evaluate these candidate vehicle trajectories to determine an operational trajectory to use for controlling the vehicle. In examples, the probabilities associated with parameter mode values may be used in this determination. For example, a candidate vehicle trajectory associated with a predicted object trajectory associated with a higher probability parameter mode value may be more likely to be determined as an operational vehicle trajectory than a candidate vehicle trajectory associated with a predicted object trajectory associated with a lower probability parameter mode value. Continuing the detected vehicle yaw example, the vehicle computing system may use, as an operational trajectory, a candidate vehicle trajectory based on a predicted object trajectory associated with the detected vehicle having a 0 degree yaw and a relatively high probability over a candidate vehicle trajectory based on a predicted object trajectory associated with the detected vehicle having a 90 degree yaw and a relatively lower probability.

In various examples, the output of the multiple parameter mode hypotheses filter component may also, or instead, be provided to one or more other systems or components configured a vehicle computing device. For example, the modes and/or their associated probability distributions may be provided to one or more components that may make individual hypotheses or predictions based on corresponding individual modes and/or probabilities. These hypotheses or predictions may be further based on other data, such as mapping data. For example, the output of the multiple parameter mode hypotheses filter component may be provided to one or more of the trajectory systems described in the patent and patent application incorporated above.

In various examples, the system and techniques described herein may be implemented in a vehicle computing system that receives data and/or is otherwise in communication with one or more sensors or sensor systems. For example, a parameter mode data determination system configured at or otherwise associated with a vehicle computing system may receive "raw" or relatively unprocessed sensor data from one or more (e.g., a plurality or all) sensors configured at a vehicle and implement the techniques described herein to determine (e.g., in conjunction with one or more other components) parameter mode values and probabilities for use in determining predicted object trajectories. Alternatively or additionally, the data received from sensor systems may include object bounding boxes, sensor data point clouds, and/or other data representations of objects and/or the environment that may be used to perform the operations described herein. In examples, this data may include parameter data and/or probability data associated with parameters that may be used in operations as described herein. Examples of techniques for determining object parameters and other object data based on sensor data can be found, for example, in U.S. patent application Ser. No. 16/866,865, filed May 5, 2020, and titled "Object Velocity and/or Yaw Rate Detection and Tracking," the contents of which is herein incorporated by reference in its entirety and for all purposes.

Alternatively or additionally, one or more of the operations described herein may be performed at a sensor system. For example, the determination of particular parameter mode values and probabilities for a particular sensor type may be performed at a component configured at the associated sensor system (e.g., a lidar system may determine parameter mode values and probabilities based on lidar data, etc.).

The systems and techniques described herein may be directed to leveraging sensor data, object detection data, and/or other data to enable a vehicle, such as an autonomous vehicle, to more accurately and efficiently determine predicted object trajectories for object within an environment in which the vehicle may be operation. Using these improved predicted object trajectories may in turn enable the vehicle to more efficiently and accurately determine an operational trajectory for controlling the vehicle through the environment. These more accurate operational trajectories may improve vehicle control and operational safety, facilitating safer navigation through an environment and increased vehicle resource utilization efficiency. In particular examples, the systems and techniques described herein may utilize subsets of parameter values for detected objects that are associated with particular modes, which may reduce data storage requirements and the processing resources needed determine predicted object trajectories and/or operational vehicle trajectories.

By using the multiple hypotheses parameter determination techniques described herein to more accurately determine predicted trajectories for dynamic objects detected in an environment, the examples described herein may facilitate a determination of safer and more accurate operational vehicle trajectories, resulting in increased safety and accuracy of vehicle control. The disclosed systems and techniques are especially advantageous to vehicle operations proximate to dynamic objects in an environment, allowing an autonomous vehicle to more safely operate in the environment. For example, the techniques described herein may be faster and/or more robust than conventional techniques, as they may increase the ability of an autonomous vehicle to accurately identify and predict the movements of objects in an environment, and therefore improve the ability of an autonomous vehicle safely navigate in an environment and more smoothly implement vehicle control operations, which may, in turn, provide safer and more comfortable rider experiences. For example, the more accurate determination of object parameters, such as those associated with object orientation, facilitated by the disclosed systems and techniques may reduce the likelihood of abrupt vehicle operational trajectory and control adjustments, thereby increasing the safe and comfortable operation of the vehicle. That is, the techniques described herein provide a technological improvement over existing object motion detection and prediction technology and vehicle trajectory determination technology.

The techniques described herein may also improve the operation of computing systems and increase resource utilization efficiency. For example, computing systems, such as vehicle computing systems, may more efficiently perform object trajectory predictions using the techniques described herein because the disclosed examples may reduce the amount of data needed to represent various parameters used to determine and/or represent predicted object trajectories by using particular modes for such parameters and associated probabilities and/or distributions. The use of particular modes may reduce the amount of data processed (e.g., by eliminating the processing of data not associated with such modes) to determine trajectories. Moreover, the resulting predicted object trajectories may be more accurate (e.g., more robust when there may be parameter uncertainty) and may therefore reduce or eliminate the need to more frequently generate and process predicted object trajectories to determine vehicle operational trajectories. The disclosed examples may also reduce the amount of data needed to represent various types of data used to represent trajectories and reduce the amount of processing required to determine trajectories by determining more accurate predicted object trajectories less often.

The systems and techniques described herein can be implemented in a number of ways. Example implementations are provided below with reference to the following figures. Although the disclosed techniques may be discussed in the context of an autonomous vehicle, the techniques described herein can be applied to a variety of systems (e.g., a semi-autonomous vehicle, a manually operated vehicle, a sensor system, a robotic platform, etc.) and are not limited to autonomous vehicles. In another example, the techniques can be utilized in an aviation or nautical context, or in any system involving vehicle or object trajectories and/or deceleration control and/or implementation point determination operations. Further, although aspects of the disclosed systems and techniques may be discussed in the context of originating with particular types of sensor data and processing with particular types of components, data and data structures as described herein can include any two-dimensional, three-dimensional, or multidimensional data and data associated with any types of sensors (e.g., cameras, lidar, radar, sonar, time-of-flight, and the like). Additionally, the systems and techniques described herein can be used with real data (e.g., captured using sensor(s)), simulated data (e.g., generated by a simulator, training data, and the like) or any combination of thereof.

FIG. 1 is a pictorial flow diagram of an example process 100 for determining object orientations using multiple hypotheses parameter determination techniques for use in controlling a vehicle. In examples, one or more operations of the process 100 may be implemented by a vehicle computing system, such as by using one or more of the components and systems illustrated in FIGS. 3, 4, and 5 and described below. For example, one or more components and systems can include those associated with multiple hypotheses parameter determination system 300 illustrated in FIG. 3 and/or multiple hypotheses parameter determination system 400 illustrated in FIG. 4. One or more components and systems can also, or instead, include those associated with vehicle computing device(s) 504, processors 516 and/or 544, memories 518 and/or 546, planning component 524, prediction component 530, multiple hypotheses parameter determination component 532, and/or parameter mode data determination component 534 illustrated in FIG. 5. In examples, the one or more operations of the process 100 may be performed by a remote system in communication with a vehicle, such as planning component 550, prediction component 548, and/or multiple hypotheses parameter determination component 552 illustrated in FIG. 5. In still other examples, the one or more operations of the process 100 may be performed by a combination of a remote system and a vehicle computing system. However, the process 100 is not limited to being performed by such components and systems, and the components.

At operation 102, a vehicle computing system may receive sensor data representing an environment. For example, a vehicle, such as an autonomous vehicle, operating within an environment and associated with the vehicle computing system may be configured with sensors that may capture sensor data in the environment. Alternatively or additionally, the vehicle computing system may receive sensor data received from one or more remote sensors. The sensor data may be captured by and/or otherwise associated with one or more sensors of any type, such as cameras, sonar sensors, lidar sensors, radar sensors, time-of-flight sensors, etc.

At operation 104, the vehicle computing system may analyze and/or process the sensor data received at operation 102 to detect one or more objects within the operating environment. Such objects may be static objects or dynamic objects. The detection or identification of such objects may be performed at a sensor system and/or a perception system associated with the vehicle.

An example 106 may represent a portion of an environment in which a vehicle 108 may be operating. The vehicle 108 may be configured with one or more sensors and a vehicle computing system. For example, the vehicle computing system of vehicle 108 may include one or more components, systems, and/or machine-learned models that may be configured to perform one or more of the multiple hypotheses parameter determination operations described herein. The vehicle 108 may be configured to detect objects in the environment and determine associated object parameters as described herein. For example, the vehicle 108 (e.g., sensor systems on configured at the vehicle 108) may detect or otherwise collect sensor data associated with a vehicle 110 and a vehicle 112.

At operation 114, the vehicle computing system may receive parameter values, such as one or more orientation parameter values, for individual modalities for one or more objects in the environment based on the sensor data collected in the environment. For example, a component of the vehicle computing system, such as a parameter mode determination component, may receive, from individual sensor systems (e.g., a lidar system, a radar system, a vision system, etc.) one or more indications of a parameter value for an object detected in the environment. Alternatively or additionally, the vehicle computing system may determine, based on sensor data received from such individual sensor systems, one or more indications of an object parameter associated with an object detected in the environment. For example, a lidar sensor system may provide an indication of yaw for particular detected object, a radar system may also provide an indication of yaw for that object, a vision system may also provide an indication of yaw for that object, and so forth. In some examples individual sensor systems may provide a single value for a particular parameter, while in other examples, a sensor system may provide multiple values for a particular parameter (in some cases along with probabilities or weights associated with such values). Additional information regarding the environment and/or objects detected therein may also be determined, such as mapping data, road data, etc. In examples, such additional information may exclude parameter data associated with the parameter values being determined by the process 100.

At operation 116, the vehicle computing system (e.g., a parameter mode data determination component or system) may determine individual parameter values for one or more modes associated with the object with which the parameter values are associated. The vehicle computing system may use the parameter values received at operation 114 to determine these individual parameter mode values. An object may be associated with a particular number and/or type of modes for particular parameters. The number and/or types of modes associated with an object may depend on the object type and/or other criteria. For example, rectangular objects, such as vehicles, may be associated with four yaw modes that may represent the four directions in which a vehicle is most likely to move (e.g., 0, 90, 180, and 270 degrees). Alternatively or additionally, an object's modes may be dynamically determined and/or may change based on various criteria.

In examples, an object type may determine modes associated with the object. Operation 116 may include determining an object type and determining the available modes for the object based on that type. For example, a motorcycle or bicycle object type may have two modes (e.g., 0 and 180 degree) while larger vehicle such as a car to truck may have four (e.g., 0, 90, 180, and 270 degrees).

At operation 118, the vehicle computing system (e.g., a parameter mode data determination component or system) may determine the probabilities associated with the parameter mode values determined at operation 116. For example, the vehicle computing system may determine a categorical distribution of the parameter mode values and determine, based on the distribution, a single row matrix, or vector, representing the individual probabilities associated with the individual parameter mode values. Continuing the yaw example, the vehicle computing system may determine a vector of four elements, where the individual elements represent a probability or weight associated with an individual one of the yaw mode values (e.g., associated with 0, 90, 180, and 270 degrees). Of course, a vector for yaw probabilities, and for probabilities for any other type of parameter contemplated in the instant disclosure, may include any number of elements (e.g., two, three, four, eight, ten, etc.).

An example 120 illustrates the portion of the environment represented in example 106, where the vehicle 108 may be operating and may have detected objects in the environment, such as vehicle 110 and a vehicle 112. Parameter modes and probabilities are also graphically represented in this example for the vehicle 110 and the vehicle 112. For example, parameter modes and probabilities 122 represents the four yaw modes for the vehicle 110, with the weight of the mode represented by the thickness and length of the arrow representing that mode (e.g., south or 180 degrees is the highest probability yaw value). Parameter modes and probabilities 124 similarly represents the four yaw modes and probabilities for the vehicle 112 (e.g., north or 0 degrees is the highest probability yaw value).

At operation 126, the vehicle computing system may canonicalize the parameter mode values so that the parameter mode values are on a common scale, in a similar form, or are otherwise associated with equivalent representations for further processing.

At operation 128, the vehicle computing system may determine filtered parameter mode values and probabilities to use for determining predicted object trajectories. In examples, a multiple parameter mode hypotheses filter system or component configured at or otherwise associated with the vehicle computing system may use a mixture model (e.g., Gaussian mixture model)) with the canonicalized parameter mode values and associated probabilities as input to determine a particular value and probability for the individual modes. For example, the individual parameter values may be represented by a Gaussian distribution that may be weighted based on the associated probability.

In various examples, a multi-modal likelihood function may be used to address ambiguities in parameters (e.g., yaw) and associated measurements. For example, a residual associated with a measurement such as yaw may include one or more multiples of $\pi/2$ errors. The individual mode likelihoods or probabilities may be represented by a Gaussian that may be weighted based on prior ambiguities. For example, equation (1) below may represent a weighted Gaussian distribution, while equation (2) may represent residuals with multiples of $\pi/2$ errors.

$$g(z \mid x) = \sum_{i=-2}^{1} w^{(i)} N(0; res^{(i)}(z + i\pi/2, h(x), R) \qquad (1)$$

$$res^{(i)}(z(\cdot), \hat{z}) = \text{remainder}(z(\cdot) - \hat{z} + \pi, 2\pi) - \pi \qquad (2)$$

In equation (1) above, g(z|x) may be a probability function that may be used derive a filtering recursion. "N(0; $res^{(i)}$(z+i$\pi$/2, h(x), R)" may represent a Gaussian density with 0 mean, covariance R, that may be evaluated at the point "res." Equation (1) may be used to model the likelihood of a parameter to be multi-modal (e.g., to have multiple hypotheses of values). For instance, using the yaw example again, equation (1) may be used to model a measured yaw as either having no yaw flip (e.g., accurately reflects a vehicle position), a positive 90 degree flip, a negative 90 degrees flip, and/or a negative 180 degrees flip. $w^{(i)}$ may represent a weight for a mode i, where i={−2, −1, 0, 1}. $w^{(i)}$ may take the form of a scaler number, where, in examples, the sum of these weights may be 1. In various examples, weights may be estimated based on ambiguities (e.g., yaw ambiguities) that may be introduced by the associated modality (e.g., detector, sensor, sensor system, etc.). In such examples, the initial weight $w^{(0)}$ may be the largest weight because it represents the probability that the associated modality did not introduce ambiguity into the associated measurement. In examples where weight $w^{(0)}$ is the largest weight, but may be dependent on a particular state and/or not confidently determined, a smaller weight estimate may be used to increase robustness of the estimates to potential modeling errors.

Equation (2) may represent a definition of the residual between a measured parameter value and a predicted parameter value (e.g., yaw value). "remainder" in equation (2) may be used to discount the $2\pi$ periodicity of angular values. In equation (2), z may represent a vector associated with a particular parameter (e.g., measurement determined by a sensor system), such as a yaw measurement. x may be a state vector associated with the parameter (e.g., yaw and/or yaw rate).

At operation 130, the filtered individual parameter mode values and their associated probabilities (e.g., as represented by a Gaussian distribution) may be used to control the vehicle. For example, these values and probabilities may be used to determine predicted object trajectories that may then be used to determine one or more candidate vehicle trajectories. An operational trajectory based on the candidate trajectories may be determined and used to control the vehicle.

An example 132 illustrates the portion of the environment represented in examples 106 and 120, where the vehicle 108 may be operating and may have detected objects in the environment, such as vehicle 110 and vehicle 112. Here, the vehicle computing system of vehicle 108 may have determined predicted object trajectory 134 for vehicle 110 and predicted object trajectory 136 for vehicle 112 based on, for example, the parameter modes and probabilities 122 and 124 of example 120, respectively. Here, the predicted object trajectories 134 and 136 may be based on the highest probability yaw values of those represented in the parameter modes and probabilities 122 and 124. The vehicle 108 may have determined an operational trajectory 138 for controlling the vehicle 108 through the environment, for example, based on a candidate trajectory determined based on the predicted object trajectories 134 and 136.

Figure 2:
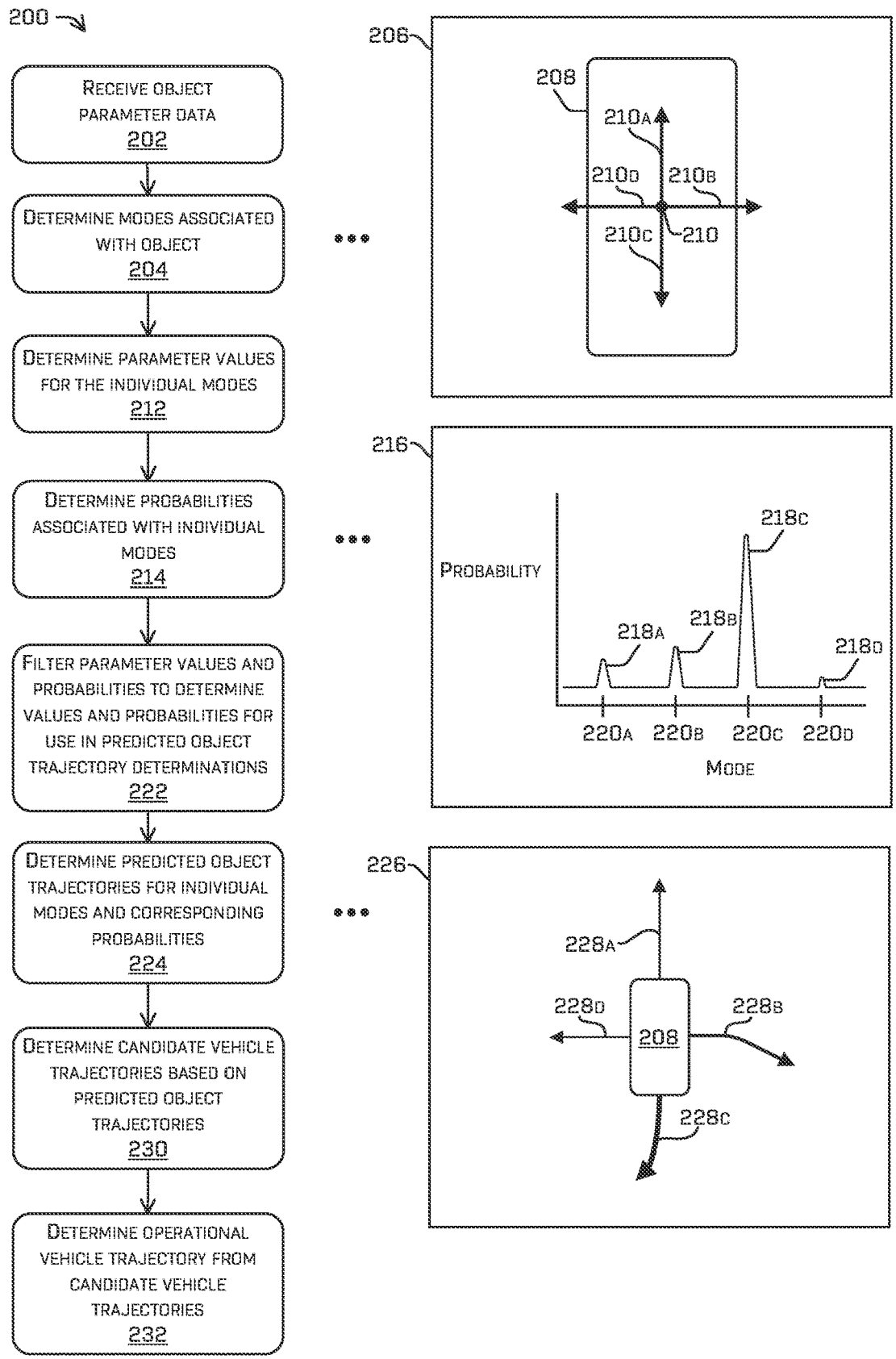
FIG. 2 is a pictorial flow diagram illustrating an example process for determining an operational trajectory for use in controlling a vehicle based on trajectories determined using vehicle parameter modes and associated probabilities, in accordance with examples of the disclosure.

FIG. 2 is a pictorial flow diagram of an example process 200 for determining object orientations using multiple hypotheses parameter determination techniques for use in controlling a vehicle. In examples, one or more operations of the process 200 may be implemented by a vehicle computing system, such as by using one or more of the components and systems illustrated in FIGS. 3, 4, and 5 and described below. For example, one or more components and systems can include those associated with multiple hypotheses parameter determination system 300 illustrated in FIG. 3 and/or multiple hypotheses parameter determination system 400 illustrated in FIG. 4. One or more components and systems can also, or instead, include those associated with vehicle computing device(s) 504, processors 516 and/or 544, memories 518 and/or 546, planning component 524, prediction component 530, multiple hypotheses parameter determination component 532, and/or parameter mode data determination component 534 illustrated in FIG. 5. In examples, the one or more operations of the process 200 may be performed by a remote system in communication with a vehicle, such as planning component 550, prediction component 548, and/or multiple hypotheses parameter determination component 552 illustrated in FIG. 5. In still other examples, the one or more operations of the process 200 may be performed by a combination of a remote system and a vehicle computing system. However, the process 200 is not limited to being performed by such components and systems, and the components.

At operation 202, a vehicle computing system may receive object parameter data associated with an object detected in an environment. For example, the vehicle computing system (e.g., a parameter mode data determination component or system) may receive an indication of one or more object parameters from one or more sensor systems. As described herein, individual sensor systems may perform detections and/or other object data determinations and may provide such data to a vehicle computing system. Alternatively or additionally, the vehicle computing system may receive "raw" or relatively unprocessed data from such sensor systems that the vehicle computing system may then process to detect objects and/or otherwise determine one or more object parameters. An object parameter may be any value or data associated with an object that may be detected in an environment, such as location data, position data, classification data, object type, heading, orientation, acceleration, velocity, etc.

At operation 204, the vehicle computing system (e.g., a parameter mode data determination component or system) may determine modes that may be associated with an object. As noted, objects may have particular modes that correspond to particular parameters. For example, a yaw parameter for a vehicle object may have four directions as modes, as described above. A classification parameter for a dynamic object may be limited to the classifications that are associated with moving objects as modes, while a classification parameter for a static object may be limited to the classifications that are associated with moving objects as modes, etc. For example, a motorcycle or bicycle may be classified as an object type that may have two modes (e.g., 0 and 180 degree) while larger vehicle such as a car to truck may be classified as an object type that may have four (e.g., 0, 90, 180, and 270 degrees). A pedestrian may be classified as an object type that has a higher number of modes due to increased maneuverability or may be classified based on environmental conditions (e.g., based on the two predominantly available directions for a sidewalk on which the pedestrian may be located (0 and 180 degrees relative to the sidewalk)). At operation 204, the vehicle computing system may determine a classification for the object and determine the modes associated with the object based on that classification. Modes may be statically configured or may be dynamically determined. Modes may also be adjusted over time or constant over time.

An example 206 illustrate an object 208 that may have been detected in an environment by, for example, a vehicle configured with one or more sensor system and a vehicle computing system. The object may have a parameter 210 associated with it that may be limited to four modes, 210a, 210b, 210c, and 210d. In examples, the individual modes 210a, 210b, 210c, and 210d may have associated values. For example, the parameter may be a parameter having a range of possible values and the individual modes may be associated with one or a subset of such values. For example, a yaw mode may be associated with a parameter value representing a particular quantity of degree. Alternatively, the parameter may be a parameter having a discrete set of individual values and the individual modes may be selected from a subset of such values. For example, a classification mode for a dynamic object may be one of a subset of classifications for all objects, where the subset is applicable to (e.g., only) dynamic objects.

At operation 212, the values for the individual modes may be determined by the vehicle computing system (e.g., by the parameter mode data determination component or system). The vehicle computing system may use the object data received at operation 202 from sensor systems of one or more modalities (e.g., lidar sensors, radar sensors, vision sensors, etc.) to determine a (e.g., single) parameter mode value for the individual modes associated with the object.

At operation 214, one or more probabilities associated with individual parameter modes determined at operation 212 may be determined by a vehicle computing system (e.g., a parameter mode data determination component or system). For example, based on the object data received at operation 202, the vehicle computing system may determine a probability for the individual modes (e.g., more sensors reporting a particular mode value may increase the probability for that mode value while fewer sensors reporting another mode value may decrease the probability for that mode value).

An example 216 illustrates a probability distribution for parameter mode values 220a, 220b, 220c, and 220d corresponding to modes 210a, 210b, 210c, and 210d of example 206. These individual modes have respectively corresponding probabilities 218a, 218b, 218c, and 218d. As can be seen in this example, the mode 210c having the parameter mode value 220c has the highest probability 218c.

At operation 222, the vehicle computing system (e.g., a multiple parameter mode hypotheses filter system or component) may filter the parameter values and probabilities to determine values and probabilities for the individual modes associated with an object that may then be used to determine predicted object trajectories for the object. In examples, the parameter mode values may be canonicalized prior to filtering. This filtering operation may include executing a mixture model (e.g., Gaussian mixture model)) using the (e.g., canonicalized) parameter mode values and associated probabilities determined at operations 212 and 214 to determine individual filtered parameter mode values and associated probabilities, for example represented as weighted Gaussian distributions.

At operation 224, the vehicle computing system (e.g., a prediction component or system) may determine one or more individual predicted object trajectories based on corresponding individual filtered parameter mode values and associated probabilities. The probability associated with an individual mode may be represented in its corresponding predicted object trajectory. For example, a predicted object trajectory may include, or be based on, a particular parameter mode value (e.g., a trajectory associated with a yaw of 180 degrees for an object may include predicting that the object will travel in that direction). The predicted object trajectory may also include, or otherwise indicate, that the probability associated with that particular parameter mode value (e.g., the probability associated with a yaw of 180 degrees).

An example 226 illustrates predicted object trajectories 228a, 228b, 228c, and 228d that may be associated with the object 208 and may be determined based on the values 220a, 220b, 220c, and 220d and corresponding probabilities 218a, 218b, 218c, and 218d that may correspond to modes 210a, 210b, 210c, and 210d, respectively. With the parameter value probability being indicated by heavier lines, in this example the predicted object trajectory 228c is associated with the highest probability 218c for the parameter mode value 220c.

At operation 230, one or more candidate vehicle trajectories may be determined (e.g., by a planning system of component) based on the predicted object trajectories determined at operation 224. In examples, the vehicle computing system may account for the parameter mode values and/or probabilities in determining candidate vehicle trajectories. For example, if the vehicle computing system determines a candidate vehicle trajectory based on a predicted object trajectory having a parameter mode value of a relatively high probability, the candidate vehicle trajectory may also be assigned or otherwise determined to have a higher probability of accuracy and/or utility (e.g., in conjunction with other criteria). Alternatively, if the vehicle computing system determines a candidate vehicle trajectory based on a predicted object trajectory having a parameter mode value of a relatively low probability, the candidate vehicle trajectory may also be assigned or otherwise determined to have a lower probability of accuracy and/or utility (e.g., in conjunction with other criteria).

At operation 232, the vehicle computing system (e.g., a planning component) may determine an operational trajectory from among the candidate vehicle trajectories determined at operation 230. The parameter mode values and associated probabilities may impact this determination as they may affect the predicted object trajectories on which the candidate vehicle trajectories are determined. However, other factors may affect and even outweigh parameter mode values and probabilities, which may result in the use of an operational trajectory associated with a low probability parameter mode value for an object in the environment. For example, a first object having a low probability parameter mode value may be inconsequential to the operational trajectory of the vehicle (e.g., unlikely to intersect the vehicle) while one or more other objects with high probability parameter mode values may be more likely to affect the vehicle. Therefore, a trajectory associated with the low probability parameter mode value for the first object may be determined because it reduces the likelihood of the vehicle intersecting with the one or more other objects with high probability parameter mode values.

Because predicted object trajectories may be based on particular parameters modes and may integrate the probabilities associated with such modes, the vehicle computing system may have more complete and accurate information integrated into candidate vehicle trajectories determined based on such predicted object trajectories. Therefore, the vehicle computing system may have more accurate and reliable information on which to base operational trajectory decisions, reducing the possibility of abrupt trajectory changes and potentially hazardous vehicle operation.

Figure 3:
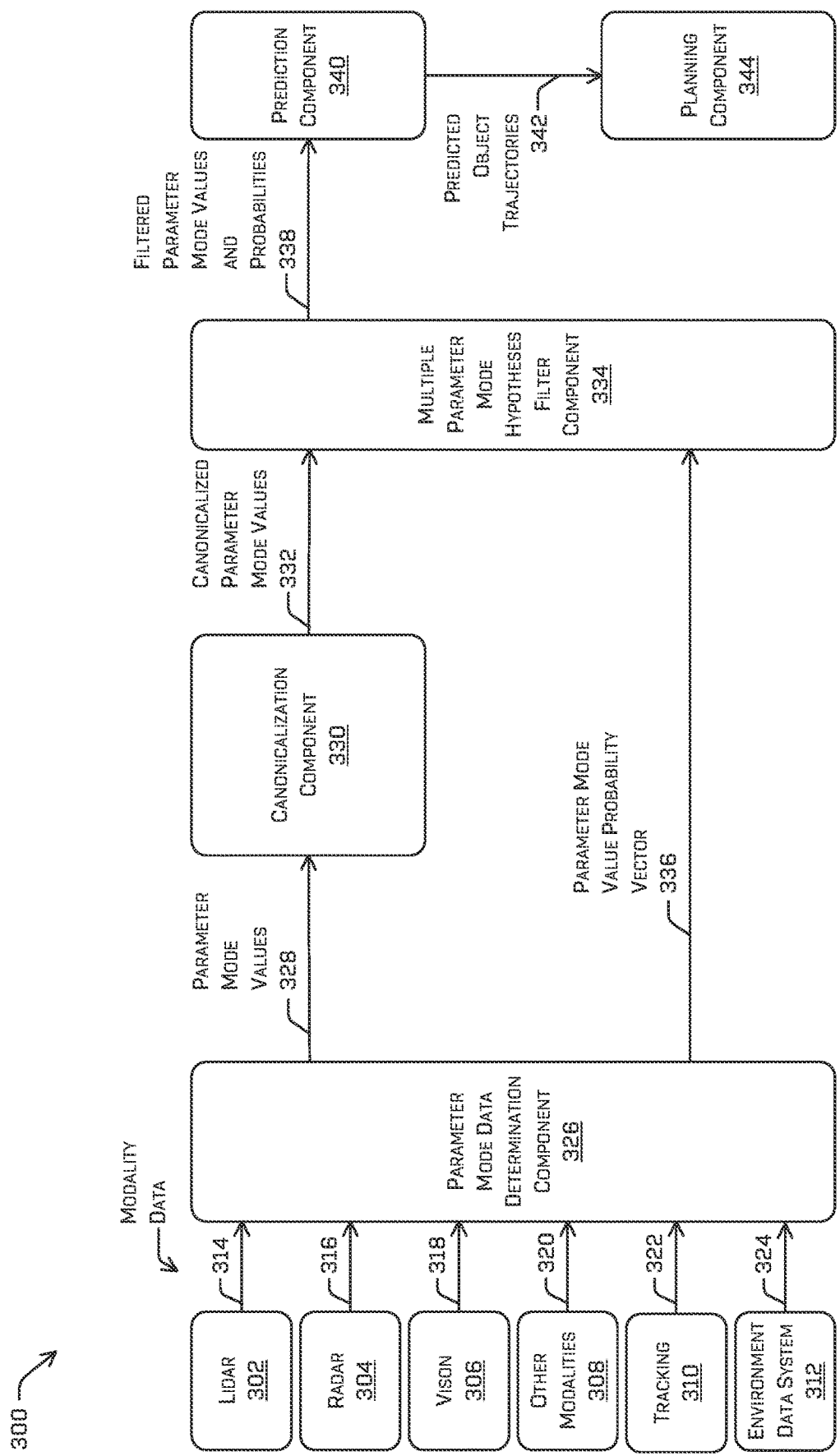
FIG. 3 is a block diagram of an example multiple hypotheses parameter determination system that may be configured to perform the disclosed techniques, in accordance with examples of the disclosure.
Figure 5:
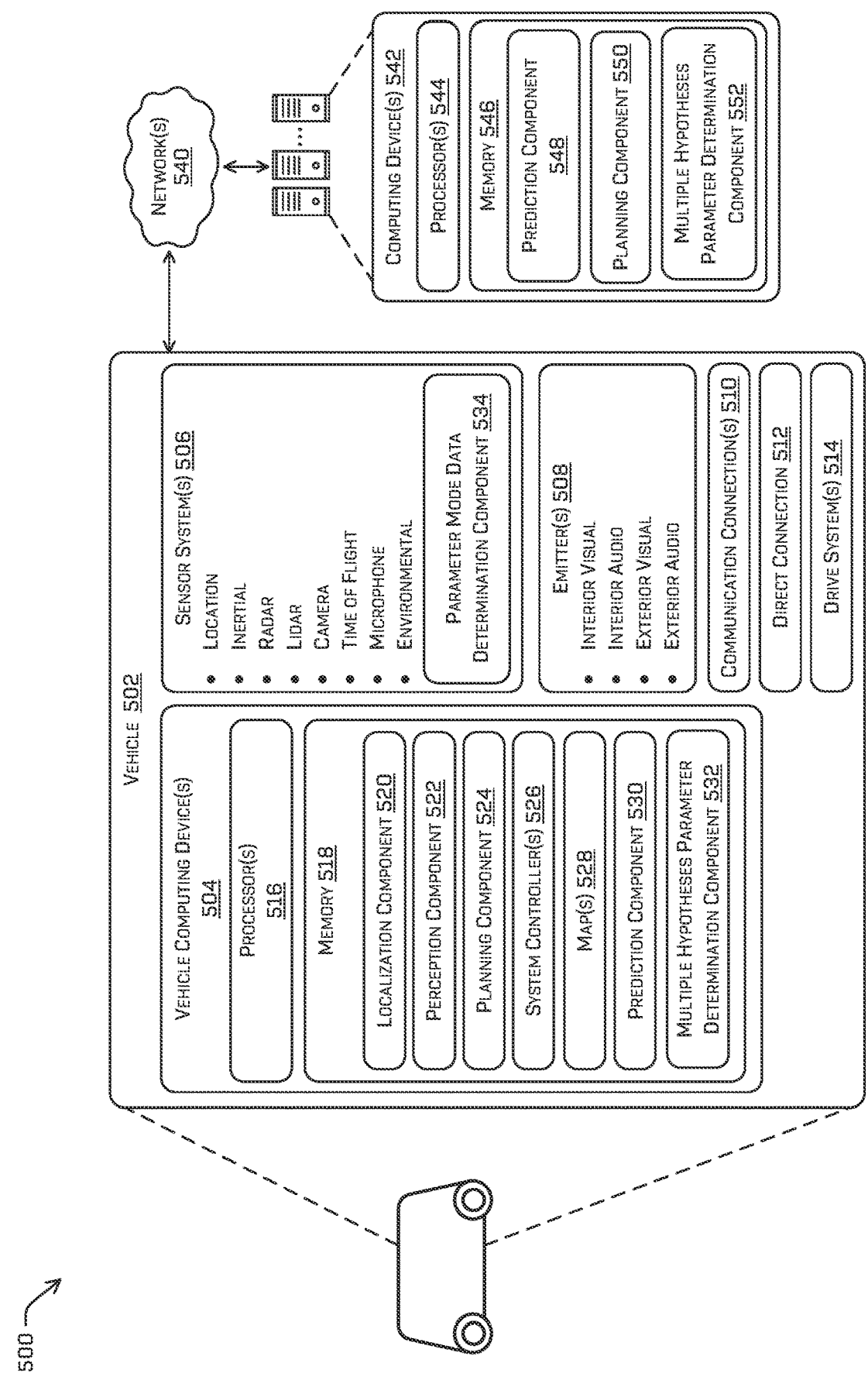
FIG. 5 depicts a block diagram of an example system for implementing the techniques described herein.

FIG. 3 is a block diagram of an example multiple hypotheses parameter determination system 300 according to various examples. The system 300 may be implemented at a vehicle (e.g., an autonomous vehicle) by a vehicle computing system and/or by a remote system. In various examples, the system may be implemented at, or interact with, a perception system, a prediction system, a tracking system, and/or planning system that may be configured to control a vehicle and/or to provide data, including trajectory data, for use in controlling a vehicle. The system 300 may include one or more of the components and systems illustrated in FIG. 5 and described below. These components may be configured as described herein or in any other configuration and may perform any subset of their associated operations in any or and/or in conjunction with other one or more other operations. For example, one or more components and systems can include those associated with processors 516 and/or 544, memories 518 and/or 546, perception component 522, planning component 524, prediction component 530, multiple hypotheses parameter determination component 532, and/or parameter mode data determination component 534 illustrated in FIG. 5. In examples, the one or more operations performed by the system 300 may be performed by a remote system in communication with a vehicle, such as prediction component 548, planning component 550, and/or multiple hypotheses parameter determination component 552 illustrated in FIG. 5. In still other examples, the one or more operations performed by the system 300 may be performed by a combination of a remote system and a vehicle computing system. However, the system 300 is not limited to such components and systems, and the components and systems of FIG. 5 are not limited to performing the operations performed by the components of system 300.

The system 300 may include, or may receive data from, sensor systems associated with a plurality of modalities. For example, the system 300 may include a lidar system 302 that may provide lidar data 314, for example to a parameter mode determination component 326 configured at the system 300. Lidar data 314 may be "raw" or relatively unprocessed lidar sensor data and/or any other data that the lidar system 302 may determine and/or generate, including one or more parameter values and associated probabilities. The system 300 may also, or instead, include a radar system 304 that may provide radar data 316. Like lidar data 314, radar data 316 may be "raw" or relatively unprocessed radar sensor data and/or any other data that the radar system 304 may determine and/or generate, including one or more parameter values and associated probabilities. The system 300 may also, or instead, include a vision system 306 that may provide vision data 318. Like lidar data 314 and radar data 316, vision data 318 may be "raw" or relatively unprocessed vision sensor data (e.g., images) and/or any other data that the vision system 306 may determine and/or generate, including one or more parameter values and associated probabilities. The system 300 may also, or instead, include one or more sensor systems associated with other modalities 308 that may provide sensor data 320. Sensor data 320 may also be "raw" or relatively unprocessed sensor data and/or any other data that the vision system 306 may determine and/or generate, including one or more parameter values and associated probabilities.

The system 300 may also receive data associated with the environment and/or vehicle that may be used in performing multiple hypotheses parameter determination operations. For example, the system 300 may receive tracking data 322 from one or more tracking systems 310 that may be a tracking network or system of any type configured to track a vehicle and/or one or more objects in the environment (e.g., a tracking neural network, a deep tracking network, etc.). The tracking data 322 may include any tracking data and associated probabilities that may be used by the multiple hypotheses parameter determination system 300 to determine parameter mode values and/or probabilities. In examples, the tracking data may be associated with the object for which the system 300 may be processing one or more parameters. Alternatively or additionally, the tracking data may be associated with one or more other objects and/or the vehicle at which the system 300 may be configured.

The system 300 may also receive other environmental data 324 from one or more environment data systems 312.

For example, environment data system(s) 312 may include a mapping system or component that may provide mapping data as environmental data 324 and/or a detection system that may provide object, region, and/or environment detection data as environmental data 324. Any other environmental data may also, or instead, be provided as environmental data 324 by any other system. In examples, however, to avoid compounding potentially erroneous data, no previously determined parameter mode values and/or probabilities may be provided to parameter mode determination component 326 for parameters that the parameter mode determination component 326 is current performing parameter mode value and probability determinations.

The parameter mode determination component 326 may be configured to receive this sensor and environmental data and determine one or more parameter mode values and/or probabilities. For example, individual of the lidar data 314, radar data 316, vision data 318 and other sensor data 320 may include a value for a particular parameter. The parameter mode determination component 326 may determine one or more modes associated with the parameters and determine particular mode value(s) for the individual modes based on the parameter values received from the sensors. The parameter mode determination component 326 may further determine one or more probabilities for the determined individual parameter mode values. These determinations may be further based on environmental and/or other data (e.g., tracking data 322 and/or environmental data 324).

In examples, the parameter mode determination component 326 may determine from among parameters values provided by sensor systems associated with a particular mode, the highest value to use as the parameter mode value for that particular mode. Alternatively, the parameter mode determination component 326 may use the parameters values provided by sensor systems associated with a particular mode to determine a parameter mode value for that particular mode (e.g., by averaging the values, using a median value, performing another function based on such values, etc.). Other parameter values not associated with a particular mode may be excluded for further processing, reducing the processing and memory resource required to operate the multiple hypotheses parameter determination system 300.

In examples, the parameter mode determination component 326 may use one or more confidence values and/or probabilities provided by the sensor systems and associated with the reported parameter values to determine a value to be used as a parameter mode value for a particular mode (e.g., use the highest confidence parameter value as the parameter mode value). Alternatively or additionally, the parameter mode determination component 326 may use one or more historical parameter values to determine a value to be used as a parameter mode value for a particular mode. For example, even if a particular sensor system provides a very high confidence parameter value, if it is different the most recent parameter mode values, the parameter mode determination component 326 may not use it until it has received one or more subsequent parameter values for that mode that are similar. This may avoid a sudden and possibly inaccurate change in the parameter. In other examples, particular modalities may be favored based on weather conditions. For instance, parameter values from sensor systems that operate more accurately in the current weather conditions may be preferred over those that are more likely to be adversely affected by the current weather conditions (e.g., radar may be preferred in fog over vision).

In various embodiments, one or more modalities may be disregarded or unavailable for various reasons (e.g., due to low confidences and/or probabilities, component malfunctions and/or failures, etc.). Parameter mode data and probabilities from the remaining sensor systems may be used to determine parameter mode values. Due to the parameter mode values and probabilities determined as described herein, the vehicle computing system may be able to determine, with relatively high confidence, values for parameters, enabling the operation of the vehicle despite incomplete or unavailable data from one or more of its components.

The parameter mode determination component 326 may also determine, based on the received sensor data and/or other environmental data, a probability or probability distribution for individual mode values. This probability or distribution may indicate a confidence in the associated mode value determined for the particular parameter. For example, a parameter value for an object from a sensor that has an obscured view of the object or that is a relatively larger distance from the object may have a lower probability parameter mode value than a parameter value from a sensor that has a clear and close view of the object. Properties that may be used to determine such probabilities may be determined from environment data. For example, map data may be used to determine a distance between an object and a sensor system and/or whether the view is obscured. Other environment data may indicate weather conditions that may adversely affect the quality of sensor data from some sensors but not others. Any such data may be used to make a probability determination for a particular parameter mode.

In various examples, the parameter mode determination component 326 may be a machine-learned model trained to determine parameter modes, parameter mode values, and/or probabilities associated with parameter mode values. For example, the parameter mode determination component 326 may be trained using training data indicating object types, object modes, parameter values, parameter mode values, and associated probabilities. The parameter mode determination component 326 may be trained to output one or more parameter mode values and a vector indicating probability data (or data based on probabilities, such as weights) that corresponds to the parameter mode values.

In an illustrative example, again using yaw as an exemplary parameter, the sensor systems may provide a variety of individual yaw values to the parameter mode determination component 326. The lidar system 302 may provide a yaw value of 180 degrees as lidar data 314, the radar system 304 may provide a yaw value of 90 degrees as radar data 316, the vision system 306 may provide a yaw value of 180 degrees as vision data 318, and the other modalities 308 may provide a yaw value of 0 degrees as sensor data 322. The parameter mode determination component 326 may therefore determine parameter values of 0, 90, and 180 degrees.

The parameter mode determination component 326 may further determine probabilities for these parameter mode values. For example, because a yaw mode value of 180 degrees was reported by more sensor systems (e.g., both lidar system 302 and vision system 306), the parameter mode determination component 326 may determine a higher probability for this mode than for the others. Alternatively, the weather conditions may be such that lidar systems and vision systems are adversely affected, while radar system are relatively unaffected. In this case, the parameter mode determination component 326 may determine a higher probability for the 90 degrees mode indicated by the radar system 304 than for the others.

The parameter mode determination component 326 may provide the determined parameter mode values 328 to the canonicalization component 330 to canonicalize the parameter mode values for further processing. For example, the values received from sensors may not use the same scale and/or may not be directly comparable to one another. The canonicalization component 330 may adjust the parameter mode values to place them on a common or equivalent scale and/or so that they use similar representations that are comparable to one another. The canonicalization component 330 may provide these canonicalized parameter mode values 332 to a multiple parameter mode hypotheses filter component 334.

The parameter mode determination component 326 may provide the determined probabilities (and/or data representative thereof) for the parameter mode values to the multiple parameter mode hypotheses filter component 334. In examples, the parameter mode determination component 326 may determine a parameter mode value probability vector 336 (e.g., a single row matrix) representing the individual probabilities associated with the individual parameter mode values. Alternatively, the parameter mode value probability vector 336 may instead include weights associated that are based on the probabilities associated with the individual modes.

The multiple parameter mode hypotheses filter component 334 may use these probabilities and the associated parameter mode values to determine filtered parameter mode values and/or distributions associated with parameter mode values. For example, the multiple parameter mode hypotheses filter component 334 may use a mixture model (e.g., Gaussian mixture model)) with the canonicalized parameter mode values and associated probabilities as input to determine a particular value and/or probability distribution for the individual parameter modes. For example, the filtered individual parameter values may be represented by as Gaussian distributions weighted based on the probabilities associated with those modes (e.g., provided as the parameter mode value probability vector 336). This filtering may further reduce the ambiguities that may be represented in the parameter mode values by using a mixture model to determine and emphasize in the parameter mode value data the most probable parameter mode values. For example, the lower probability parameter mode values will be retained for use in trajectory determination operations, but the higher probability parameter mode values will be more prominently represented by more heavily weighted probability Gaussian distributions.

The multiple parameter mode hypotheses filter component 334 may provide these resulting filtered parameter mode values and/or probabilities 338 to the prediction component 340. The prediction component 340 may use these individual mode values, probabilities, and/or probability distributions to determine associated predicted object trajectories 342. For example, the prediction component may determine an individual predicted object trajectory for the individual modes (e.g., modes associated with non-negligible values) represented in the filtered parameter mode values and/or probabilities 338. The prediction component may use the mode probabilities in determining these trajectories and/or may otherwise represent such probabilities in data associated with the trajectories. One or more downstream systems or components, such as a planning component 344 may use this data in evaluating the associated predicted object trajectories, for example, for determining candidate vehicle trajectories and/or an operational vehicle trajectory.

In various examples, the filtered parameter mode values and/or probabilities 338 output by the multiple parameter mode hypotheses filter component 334 may be conditionally provided and/or used (e.g., by the prediction 340). For example, the filtered parameter mode values and/or probabilities 338 may be used when there is some uncertainty of the parameter values (e.g., sensor systems are providing inconsistent values for a particular parameter or several low confidence values) but, where most or all of the values from the various sensor are consistent and/or of high confidence, there may be a single value provided for that parameter. This determination may be performed by the multiple parameter mode hypotheses filter component 334 and reflected in the filtered parameter mode values and/or probabilities 338 and/or by the prediction component 340, for example, based on the filtered parameter mode values and/or probabilities 338.

The predicted object trajectories 342 may be provided to the planning component 344. The planning component 344 may use the trajectories 342 to determine one or more candidate trajectories. The planning component may determine particular candidate vehicle trajectories for particular predicted object trajectories that may be based on corresponding parameter mode values and/or probabilities. For example, the planning component may determine a candidate vehicle trajectory that includes vehicle controls to avoid an object based on a predicted object trajectory that was determined using a particular parameter mode value. This candidate vehicle trajectory may implicitly or explicitly integrate the probability associated with that particular parameter mode value, for example, via data associated with the corresponding predicted object trajectory.

The planning component 344 may evaluate the candidate vehicle trajectories to determine an operational trajectory to use for controlling the vehicle. In performing this determination, the planning component 344 may explicitly or implicitly use the probabilities associated with parameter mode values that were used to determine the predicted object trajectories on which the candidate vehicle trajectories were based. For example, a higher probability parameter mode value may be reflected in a higher score, rank, or probability associated with a candidate vehicle trajectory because the candidate vehicle trajectory may integrate or otherwise reflect the higher parameter mode value probability associated with the predicted object trajectory based on the parameter mode. The planning component 344 may provide or otherwise use the determined operational trajectory to control the vehicle in an environment.

Figure 4:
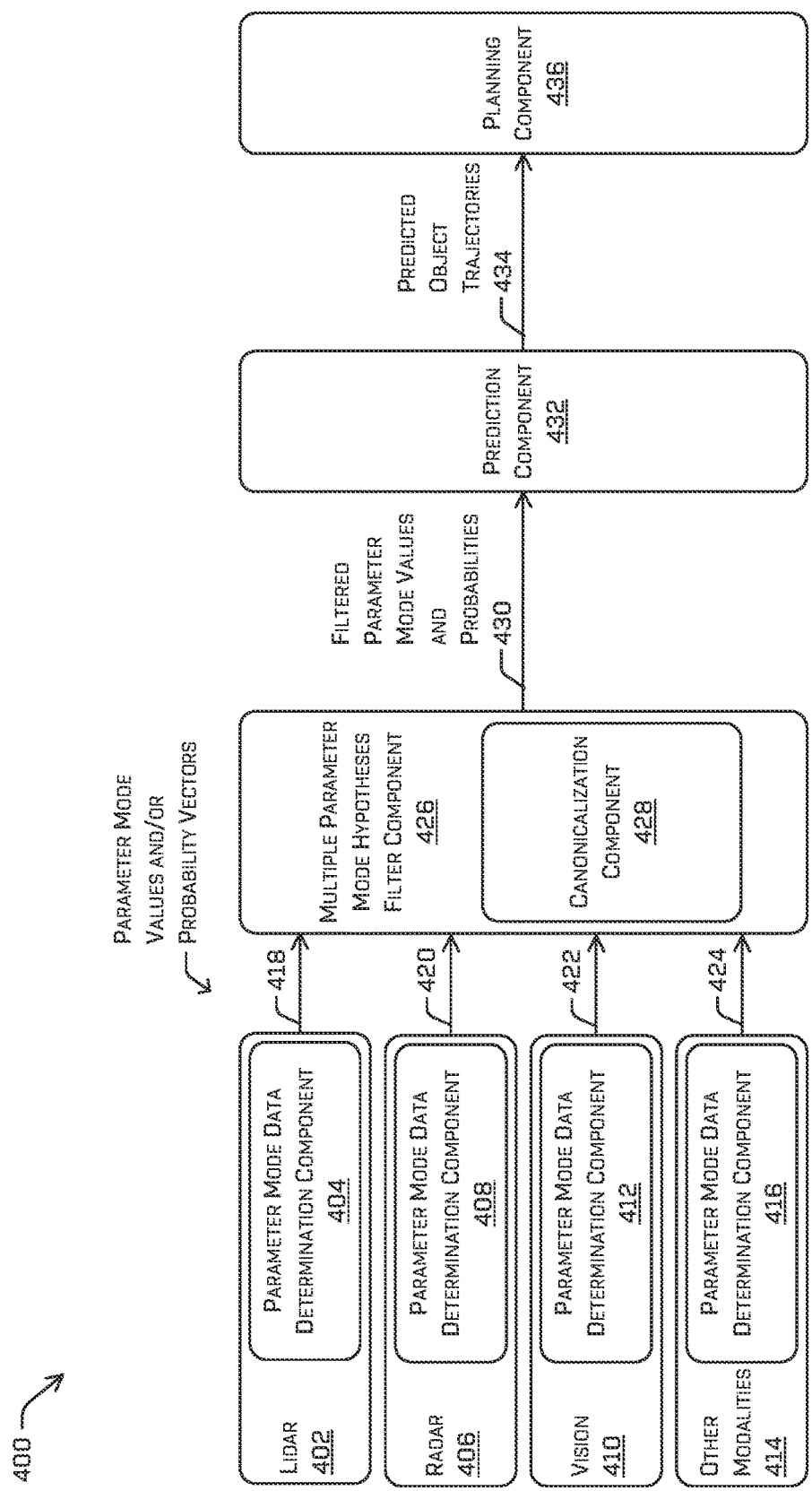
FIG. 4 is a block diagram of another example multiple hypotheses parameter determination system that may be configured to perform the disclosed techniques, in accordance with examples of the disclosure.

FIG. 4 is a block diagram of an example multiple hypotheses parameter determination system 400 according to various examples. The system 400 may be implemented at a vehicle (e.g., an autonomous vehicle) by a vehicle computing system and/or by a remote system. In various examples, the system may be implemented at, or interact with, a perception system, a prediction system, a tracking system, and/or planning system that may be configured to control a vehicle and/or to provide data, including trajectory data, for use in controlling a vehicle. The system 400 may include one or more of the components and systems illustrated in FIG. 5 and described below. These components may be configured as described herein or in any other configuration and may perform any subset of their associated operations in any or and/or in conjunction with other one or more other operations. For example, one or more components and systems can include those associated with processors 516 and/or 544, memories 518 and/or 546, perception component 522, planning component 524, prediction component 530, multiple hypotheses parameter determination component 532, and/or parameter mode data determination component 534 illustrated in FIG. 5. In examples, the one or more operations performed by the system 400 may be performed by a remote system in communication with a vehicle, such as prediction component 548, planning component 550, and/or multiple hypotheses parameter determination component 552 illustrated in FIG. 5. In still other examples, the one or more operations performed by the system 400 may be performed by a combination of a remote system and a vehicle computing system. However, the system 400 is not limited to such components and systems, and the components and systems of FIG. 5 are not limited to performing the operations performed by the components of system 400.

The multiple hypotheses parameter determination system 400 may include individual parameter mode data determination components for individual sensor systems (e.g., as opposed to system 300 where a parameter mode data determination component receives data from multiple sensor systems). By including such a component at a sensor system, the processing and data storage resource utilization may be more distributed across a vehicle and/or a vehicle computing device. Moreover, processing requirements at individual components may be reduced. For example, rather than determining a single value for a particular parameter from among the possible values determined based on collected sensor data, which may be a resource intensive operation, a sensor system configured with a parameter mode data determination component may use such a component to provide all or a subset of such values and/or their associated probabilities, which may be less resource intensive. Furthermore, by receiving such values and/or probabilities from a sensor system, the resource requirements at a multiple hypotheses parameter determination system may be reduced because the parameter mode data determination have been offloaded to the sensor systems. This configuration may also increase the accuracy of parameter mode value and probability determinations because richer data (e.g., more parameter values as potential parameter mode values and associated probabilities) may be received from a sensor system rather the just a single value determined by the sensor system using possible less accurate operations.

As with the other systems described herein, the multiple hypotheses parameter determination system 400 may include or receive data from sensor systems associated with a plurality of modalities. For example, the system 400 may include a lidar system 402 that may be configured with a parameter mode data determination component 404. The parameter mode data determination component 404 may determine parameter mode values and/or probabilities (e.g., as a vector) 418 that it may provide to the multiple parameter mode hypotheses filter component 426. Similarly, the system 400 may include a radar system 406 that may be configured with a parameter mode data determination component 408 that may determine parameter mode values and/or probabilities (e.g., as a vector) 420 that it may provide to the multiple parameter mode hypotheses filter component 426. The system 400 may also, or instead, include a vision system 410 that may be configured with a parameter mode data determination component 412 that may determine parameter mode values and/or probabilities (e.g., as a vector) 422 that it may provide to the multiple parameter mode hypotheses filter component 426. The system may also, or instead, include or receive data from any one or more other sensor systems of any modalities, represented as other modalities sensor system 414. These other modalities sensor system 414 may also be individually configured with a parameter mode data determination component, such as parameter mode data determination component 416. The parameter mode data determination component 416 may determine parameter mode values and/or probabilities (e.g., as a vector) 424 that it may provide to the multiple parameter mode hypotheses filter component 426.

The parameter mode data determination components 404, 408, 412, and/or 416 may receive data associated with the environment, such as tracking data, mapping data, detection data, etc., that may be used to determine parameter mode values and/or probabilities as described herein.

In various examples, the parameter mode determination components 404, 408, 412, and/or 416 may individually be a machine-learned model trained to determine parameter modes, parameter mode values, and/or probabilities associated with parameter mode values. For example, these parameter mode determination components may be trained using training data indicating object types, object modes, parameter values, parameter mode values, and associated probabilities. The parameter mode determination components 404, 408, 412, and/or 416 may be trained to output one or more parameter mode values and a vector indicating probability data (or data based on probabilities, such as weights) that corresponds to the parameter mode values.

The parameter mode values and the associated probabilities (and/or data representative thereof) may be provided to the for the multiple parameter mode hypotheses filter component 426. In various examples, this data may be standardized or otherwise in a form that may be processed by the multiple parameter mode hypotheses filter component 426 (e.g., without substantial modification or processing, such as canonicalization). In other examples, the multiple parameter mode hypotheses filter component 426 may be configured with a canonicalization component 428 that may canonicalize the parameter mode values received from the sensor system's parameter mode data determination components. Alternatively this component may be distinct from the multiple parameter mode hypotheses filter component 426 and/or integrated into the parameter mode data determination components.

The multiple parameter mode hypotheses filter component 426 may use the probabilities and the associated parameter mode values received from the sensor systems to determine filtered parameter mode values and/or probabilities 430 associated with parameter mode values. For example, the multiple parameter mode hypotheses filter component 426 may use a mixture model (e.g., Gaussian mixture model)) with the canonicalized parameter mode values and associated probabilities as input to determine Gaussian distributions weighted based on the probabilities associated with those modes (e.g., based on the data received from the parameter mode data determination components of the sensor systems). As noted above, this filtering may further reduce the ambiguities that may still be represented in the parameter mode values by using a mixture model to determine and emphasize in the parameter mode value data the most probable parameter mode values.

The multiple parameter mode hypotheses filter component 426 may provide these resulting filtered parameter mode values and/or probabilities 430 to the prediction component 432 that may use such data to determine predicted object trajectories 434 as described herein. The predicted object trajectories 434 may be provided to the planning component 436 for use in determining candidate trajectories and determining an operational trajectory for controlling a vehicle, in examples, also as described herein.

In various examples, as with the system of FIG. 3, the filtered parameter mode values and/or probabilities 430 output by the multiple parameter mode hypotheses filter component 426 may be conditionally provided and/or used (e.g., by the prediction 432). For example, the filtered parameter mode values and/or probabilities 430 may be used when there is some uncertainty of the parameter values (e.g., sensor systems are providing inconsistent values for a particular parameter or several low confidence values) but, where most or all of the values from the various sensor are consistent and/or of high confidence, there may be a single value provided for that parameter. This determination may be performed by the multiple parameter mode hypotheses filter component 426 and reflected in the filtered parameter mode values and/or probabilities 430 and/or by the prediction component 432, for example, based on the filtered parameter mode values and/or probabilities 430.

FIG. 5 depicts a block diagram of an example system 500 for implementing the techniques described herein. In at least one example, the system 500 can include a vehicle 502. The vehicle 502 can include a vehicle computing system or device 504 that may function as and/or perform the functions of a vehicle controller for the vehicle 502. The vehicle 502 can also include one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522, a planning component 524, one or more system controllers 526, one or more maps 528, a prediction component 530, and a multiple hypotheses parameter determination component 532. Though depicted in FIG. 5 as residing in memory 518 for illustrative purposes, it is contemplated that each of the localization component 520, the perception component 522, the planning component 524, the one or more system controllers 526, the one or more maps 528, and the prediction component 530 can additionally, or alternatively, be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, and yaw (h)). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization, and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 522 can provide processed sensor data that indicates one or more characteristics associated with a detected entity (e.g., a tracked object) and/or the environment in which the entity is positioned. The perception component 522 may use the multichannel data structures as described herein, such as the multichannel data structures generated by a deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure (e.g., a multichannel data structure generated as output of one or more deconvolution layers (e.g., learned deconvolutional upsampling decoding layer(s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc.

In general, the planning component 524 can determine a path for the vehicle 502 to follow to traverse through an environment, for example, using sideslip vectors, four-wheeled steering-related operations, and other aspects described herein. In examples, the planning component 524 can determine various routes and trajectories and various levels of detail. For example, the planning component 524 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints may include streets, intersections, global positioning system (GPS) coordinates, etc. Further, the planning component 524 can generate an instruction (e.g., control) for guiding the autonomous vehicle along at least a portion of the route from the first location to the second location. In at least one example, the planning component 524 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 526, which can be configured to control steering, propulsion, braking, safety, emitters, communication, and other systems of the vehicle 502. These system controller(s) 526 can communicate with and/or control corresponding systems of the drive system(s) 514 and/or other components of the vehicle 502.

The memory 518 can further include one or more maps 528 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 528 can include at least one map (e.g., images and/or a mesh). In some examples, the vehicle 502 can be controlled based at least in part on the maps 528. That is, the maps 528 can be used in connection with the localization component 520, the perception component 522, and/or the planning component 524 to determine a location of the vehicle 502, identify objects in an environment, and/or generate routes and/or trajectories to navigate within an environment.

In some examples, the one or more maps 528 can be stored on a remote computing device(s) (such as the computing device(s) 542) accessible via network(s) 540. In some examples, multiple maps 528 can be stored based on, for example, a characteristic (e.g., type of entity, time of day, day of week, season of the year, etc.). Storing multiple maps 528 can have similar memory requirements but increase the speed at which data in a map can be accessed.

In general, the prediction component 530 can generate predicted trajectories of objects in an environment. For example, the prediction component 530 can generate one or more predicted trajectories for vehicles, pedestrians, animals, and the like within a threshold distance from the vehicle 502. In some instances, the prediction component 530 can measure a trace of an object and generate a trajectory for the object based on observed and predicted behavior. In examples, the prediction component may receive data from the multiple hypotheses parameter determination component 532 that it may use to determine predicted object trajectories, as described herein.

In some instances, aspects of some or all of the components discussed herein can include any models, algorithms, and/or machine learning algorithms. For example, in some instances, the components in the memory 518 (and the memory 546, discussed below) can be implemented as a neural network. For instance, the memory 518 may include a deep tracking network that may be configured with a convolutional neural network (CNN). The CNN may include one or more convolution/deconvolution layers.

An example neural network is an algorithm that passes input data through a series of connected layers to produce an output. Each layer in a neural network can also comprise another neural network or can comprise any number of layers, each of which may convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, acoustic sensors, microphones, wheel encoders, environment sensors (e.g., temperature sensors, humidity sensors, light sensors, pressure sensors, etc.), etc. The sensor system(s) 506 can include multiple instances of each of these or other types of sensors. For instance, the camera sensors can include multiple cameras disposed at various locations about the exterior and/or interior of the vehicle 502. The sensor system(s) 506 can provide input to the vehicle computing device 504. Additionally, or alternatively, the sensor system(s) 506 can send sensor data, via the one or more networks 540, to the one or more computing device(s) at a particular frequency, after a lapse of a predetermined period of time, in near real-time, etc. In examples, one or more of the sensor systems 506 may include a parameter mode data determination component 534 that may determine parameter mode values for and/or associated probabilities that may be used as described herein (e.g., by a prediction component and/or in conjunction with a multiple parameter mode hypotheses filter component or system) to determine one or more predicted object trajectories.

The vehicle 502 can also include one or more emitters 508 for emitting light (visible and/or non-visible) and/or sound. The emitter(s) 508 in an example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 540. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In some examples, the vehicle 502 can send sensor data, audio data, collision data, and/or other types of data to one or more computing device(s) 542 via the network(s) 540. In some examples, the vehicle 502 can send raw sensor data to the computing device(s) 542. In other examples, the vehicle 502 can send processed sensor data and/or representations of sensor data (e.g., multichannel data structures representing sensor data) to the computing device(s) 542. In some examples, the vehicle 502 can send sensor data to the computing device(s) 542 at a particular frequency, after a lapse of a predetermined period of time, in near real-time, etc. In some cases, the vehicle 502 can send sensor data (raw or processed) to the computing device(s) 542 as one or more log files.

The computing device(s) 542 can include processor(s) 544 and a memory 546 storing one or more prediction components 548, planning components 550, and or multiple hypotheses parameter determination components 552. In some instances, the prediction component 548 can substantially correspond to the prediction component 530 and can include substantially similar functionality. In some instances, the planning component 550 can substantially correspond to the planning component 524 and can include substantially similar functionality. In some instances, multiple hypotheses parameter determination component 552 can substantially correspond to the multiple hypotheses parameter determination components 532 and can include substantially similar functionality.

The processor(s) 516 of the vehicle 502 and the processor(s) 544 of the computing device(s) 542 can be any suitable processor capable of executing instructions to process data and perform operations as described herein. By way of example and not limitation, the processor(s) 516 and 544 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 546 are examples of non-transitory computer-readable media. The memory 518 and 546 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 542 and/or components of the computing device(s) 542 can be associated with the vehicle 502. That is, the vehicle 502 can perform one or more of the functions associated with the computing device(s) 542, and vice versa.

EXAMPLE CLAUSES

The following paragraphs describe various examples. Any of the examples in this section may be used with any other of the examples in this section and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving sensor data associated with an environment from a plurality of sensor systems of a vehicle, wherein individual sensor systems of the plurality of sensor systems are associated with a respective sensor modality; determining, based at least in part on the sensor data, a plurality of object orientation values associated with an object in the environment, wherein an individual object orientation value of the plurality of object orientation values is associated with an individual sensor system of the plurality of sensor systems; executing a machine-learned (ML) model to determine, based at least in part on the plurality of object orientation values: a first object orientation value and a first probability for a first mode of a plurality of modes associated with object orientation; and a second object orientation value and a second probability for a second mode of the plurality of modes; determining, based at least in part on the first object orientation value and the first probability, a first probability distribution associated with the first mode; determining, based at least in part on the second object orientation value and the second probability, a second probability distribution associated with the second mode; and controlling the vehicle in the environment based at least in part on the first probability distribution and the second probability distribution.

B: The system of paragraph A, wherein determining the first probability distribution comprises determining a first Gaussian mixture model based at least in part on the first object orientation value and the first probability.

C: The system of paragraph A or B, wherein the first object orientation value, the first probability, the second object orientation value, and the second probability are further based at least in part on at least one of environmental data associated with the environment or tracking data associated with the object.

D: The system of any of paragraphs A-C, wherein controlling the vehicle comprises: determining a predicted object trajectory based at least in part on the first probability distribution, the predicted object trajectory comprising data indicating the first probability distribution; and determining a trajectory to control the vehicle based at least in part on the data indicating the first probability distribution.

E: The system of any of paragraphs A-D, wherein the operations further comprise: determining a classification of the object; and determining the plurality of modes based at least in part on the classification of the object.

F: One or more non-transitory computer-readable media storing instructions that, when executed by one or more processors, perform operations comprising: determining, based at least in part on sensor data generated by at least a sensor of a vehicle, a plurality of values for a current physical parameter associated with an object in an environment; executing a machine-learned (ML) model to determine, based at least in part on the plurality of values, a parameter value of the plurality of values corresponding to a mode associated with the current physical parameter and a probability associated with the parameter value; determining, based at least in part on the parameter value and the probability, a probability distribution associated with the mode; determining, based at least in part on the probability distribution, a prediction for the object; and controlling, based at least in part on the prediction, the vehicle.

G: The one or more non-transitory computer-readable media of paragraph F, wherein the at least a sensor comprises multiple modalities of sensors and wherein an individual value of the plurality of values is generated by each of the multiple modalities.

H: The one or more non-transitory computer-readable media of paragraph F or G, wherein executing the ML model comprises executing the ML model to: determine, based at least in part on the plurality of values, a second parameter value of the plurality of values corresponding to a second mode of a plurality of modes associated with the current physical parameter and a second probability associated with the second parameter value; and output the probability and the second probability as a vector.

I: The one or more non-transitory computer-readable media of any of paragraphs F-H, wherein: the mode is associated with a plurality of modes associated with the current physical parameter; executing the ML model comprises executing the ML model to determine, based at least in part on the plurality of values, a second parameter value of the plurality of values corresponding to a second mode of the plurality of modes and a second probability associated with the second parameter value; and the operations further comprise: determining, based at least in part on the second parameter value and the second probability, a second probability distribution associated with the second mode; and determining, based at least in part on second probability distribution, a second prediction for the object.

J: The one or more non-transitory computer-readable media of paragraph I, wherein determining the prediction is further based at least in part the probability distribution associated with the mode and the second probability distribution associated with the second mode.

K: The one or more non-transitory computer-readable media of paragraph I or J, wherein: the operations further comprise canonicalizing the parameter value and the second parameter value; determining the probability distribution associated with the mode is further based at least in part on the canonicalizing the parameter value and the second parameter value; and determining the second probability distribution associated with the second mode is further based at least in part on the canonicalizing the parameter value and the second parameter value.

L: The one or more non-transitory computer-readable media of any of paragraphs F-K, wherein the current physical parameter is associated with at least one of: an orientation; a heading; a velocity; or an acceleration.

M: The one or more non-transitory computer-readable media of any of paragraphs F-L, wherein the operations further comprise: determining a classification of the object; and determining a plurality of modes comprising the mode based at least in part on the classification of the object.

N: The one or more non-transitory computer-readable media of paragraph M, wherein: the classification is associated with a vehicle; the current physical parameter is yaw; and the plurality of modes comprises one or more of 0 degrees, 90 degrees, 180 degrees, or 270 degrees.

O: A method comprising: determining, based at least in part on sensor data, a plurality of values for a current physical parameter associated with an object in an environment, wherein individual values of the plurality of values are associated with a sensor system configured at a vehicle; determining, based at least in part on the plurality of values, a parameter value of the plurality of values corresponding to a mode associated with the current physical parameter and a probability associated with the parameter value; determining, based at least in part on the parameter value and the probability, a probability distribution associated with the mode; determining, based at least in part on probability distribution, a predicted object trajectory for the object; and determining, based at least in part on the predicted object trajectory, a trajectory to control the vehicle in the environment.

P: The method of paragraph O, wherein determining the probability distribution comprises determining a Gaussian mixture model based at least in part on the parameter value and the probability.

Q: The method of paragraph O or P, wherein determining the parameter value and the probability is further based at least in part on at least one of environmental data associated with the environment or tracking data associated with one or more dynamic objects in the environment.

R: The method of any of paragraphs O-Q, wherein determining the trajectory to control the vehicle comprises: determining a candidate vehicle trajectory based at least in part on the predicted object trajectory, wherein the candidate vehicle trajectory is associated with data associated with the probability distribution; and determining the candidate vehicle trajectory as the trajectory to control the vehicle based at least in part on the data associated with the probability distribution.

S: The method of any of paragraphs O-R, wherein determining, the parameter value and the probability comprises determining the parameter value and the probability at a component configured at the sensor system.

T: The method of any of paragraphs O-S, wherein the mode is one of a plurality of modes associated with at least one of a type of the object or the current physical parameter.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

Conclusion

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. One or more non-transitory computer-readable media storing instructions that, when executed by one or more processors, perform operations comprising:
    determining, based at least in part on sensor data generated by at least a sensor of a vehicle, a plurality of parameter values for a current physical parameter associated with an object in an environment;
    executing a machine-learned (ML) model to determine, based at least in part on the plurality of parameter values, a parameter value of the plurality of parameter values corresponding to a mode associated with the current physical parameter associated with the object and a probability associated with the parameter value;
    wherein the mode associated with the current physical parameter is a common possible parameter value of the current physical parameter;
    determining, based at least in part on the parameter value and the probability, a probability distribution associated with the mode;
    determining, based at least in part on the probability distribution, a prediction for the object; and
    controlling, based at least in part on the prediction, the vehicle.

2. The one or more non-transitory computer-readable media of claim 1, wherein the at least a sensor comprises multiple sensor modalities, and wherein an individual parameter value of the plurality of parameter values is generated by each of the multiple sensor modalities.

3. The one or more non-transitory computer-readable media of claim 1, wherein executing the ML model comprises executing the ML model to:
    determine, based at least in part on the plurality of parameter values, a second parameter value of the plurality of parameter values corresponding to a second mode of a plurality of modes associated with the current physical parameter and a second probability associated with the second parameter value; and
    output the probability and the second probability as a vector.

4. The one or more non-transitory computer-readable media of claim 1, wherein:
    the mode is associated with a plurality of modes associated with the current physical parameter;

executing the ML model comprises executing the ML model to determine, based at least in part on the plurality of parameter values, a second parameter value of the plurality of parameter values corresponding to a second mode of the plurality of modes associated with the current physical parameter and a second probability associated with the second parameter value; and the operations further comprise:
  determining, based at least in part on the second parameter value and the second probability, a second probability distribution associated with the second mode; and
  determining, based at least in part on second probability distribution, a second prediction for the object.

5. The one or more non-transitory computer-readable media of claim 4, wherein determining the prediction for the object is further based at least in part on the probability distribution associated with the mode and the second probability distribution associated with the second mode.

6. The one or more non-transitory computer-readable media of claim 4, wherein:
  the operations further comprise canonicalizing the parameter value and the second parameter value;
  determining the probability distribution associated with the mode is further based at least in part on the canonicalizing the parameter value and the second parameter value; and
  determining the second probability distribution associated with the second mode is further based at least in part on the canonicalizing the parameter value and the second parameter value.

7. The one or more non-transitory computer-readable media of claim 1, wherein the current physical parameter is associated with at least one of:
  an orientation;
  a heading;
  a velocity; or
  an acceleration.

8. The one or more non-transitory computer-readable media of claim 1, wherein the operations further comprise:
  determining a classification of the object; and
  determining a plurality of modes comprising the mode based at least in part on the classification of the object.

9. The one or more non-transitory computer-readable media of claim 8, wherein:
  the classification is associated with a vehicle;
  the current physical parameter is yaw; and
  the plurality of modes comprises one or more of 0 degrees, 90 degrees, 180 degrees, or 270 degrees.

10. A method comprising:
  determining, based at least in part on sensor data generated by at least a sensor of a vehicle, a plurality of parameter values for a current physical parameter associated with an object in an environment;
  executing a machine-learned (ML) model to determine, based at least in part on the plurality of parameter values, a parameter value of the plurality of parameter values corresponding to a mode associated with the current physical parameter and a probability associated with the parameter value;
  wherein the mode associated with the current physical parameter is a common possible parameter value of the current physical parameter;
  determining, based at least in part on the parameter value and the probability, a probability distribution associated with the mode;
  determining, based at least in part on the probability distribution, a prediction for the object; and
  controlling, based at least in part on the prediction, the vehicle.

11. The method of claim 10, wherein:
  the mode is associated with a plurality of modes associated with the current physical parameter;
  executing the ML model comprises executing the ML model to determine, based at least in part on the plurality of parameter values, a second parameter value of the plurality of parameter values corresponding to a second mode of the plurality of modes associated with the current physical parameter and a second probability associated with the second parameter value; and
  the method further comprising:
    determining, based at least in part on the second parameter value and the second probability, a second probability distribution associated with the second mode; and
    determining, based at least in part on second probability distribution, a second prediction for the object.

12. The method of claim 11, wherein determining the prediction for the object is further based at least in part on the probability distribution associated with the mode and the second probability distribution associated with the second mode.

13. The method of claim 11, further comprising:
  canonicalizing the parameter value and the second parameter value;
  determining the probability distribution associated with the mode is further based at least in part on the canonicalizing the parameter value and the second parameter value; and
  determining the second probability distribution associated with the second mode is further based at least in part on the canonicalizing the parameter value and the second parameter value.

14. The method of claim 10, further comprising:
  determining that a classification of the object is associated with a vehicle; and
  further wherein the current physical parameter is yaw; and
  the mode is associated with a plurality of modes associated with the current physical parameter, the plurality of modes associated with the current physical parameter comprising one or more of 0 degrees, 90 degrees, 180 degrees, or 270 degrees.

15. The method of claim 10, wherein the current physical parameter is associated with at least one of:
  an orientation;
  a heading;
  a velocity; or
  an acceleration.

16. A system comprising:
  one or more processors; and
  one or more non-transitory computer-readable media storing instructions executable by the one or more processors, wherein the instructions, when executed, cause the system to perform operations comprising:
    determining, based at least in part on sensor data generated by at least a sensor of a vehicle, a plurality of parameter values for a current physical parameter associated with an object in an environment, wherein the current physical parameter is associated with at least one of an orientation, a heading, a velocity, or an acceleration;
    executing a machine-learned (ML) model to determine, based at least in part on the plurality of parameter values, a parameter value of the plurality of parameter values corresponding to a mode associated with the current physical parameter and a probability associated with the parameter value;

wherein the mode associated with the current physical parameter is a common possible parameter value of the current physical parameter;

determining, based at least in part on the parameter value and the probability, a probability distribution associated with the mode;

determining, based at least in part on the probability distribution, a prediction for the object; and controlling, based at least in part on the prediction, the vehicle.

17. The system of claim 16, wherein:

the mode is associated with a plurality of modes associated with the current physical parameter;

executing the ML model comprises executing the ML model to determine, based at least in part on the plurality of parameter values, a second parameter value of the plurality of parameter values corresponding to a second mode of the plurality of modes associated with the current physical parameter and a second probability associated with the second parameter value; and the operations further comprise:
  determining, based at least in part on the second parameter value and the second probability, a second probability distribution associated with the second mode; and
  determining, based at least in part on second probability distribution, a second prediction for the object.

18. The system of claim 17, wherein determining the prediction for the object is further based at least in part on the probability distribution associated with the mode and the second probability distribution associated with the second mode.

19. The system of claim 17, wherein:

the operations further comprise canonicalizing the parameter value and the second parameter value;

determining the probability distribution associated with the mode is further based at least in part on the canonicalizing the parameter value and the second parameter value; and determining the second probability distribution associated with the second mode is further based at least in part on the canonicalizing the parameter value and the second parameter value.

20. The system of claim 16, wherein:

the operations further comprise determining that a classification of the object is associated with a vehicle; and further wherein the current physical parameter is yaw; and the mode is associated with a plurality of modes associated with the current physical parameter, the plurality of modes associated with the current physical parameter comprising one or more of 0 degrees, 90 degrees, 180 degrees, or 270 degrees.

* * * * *